United States Patent [19]

van der Schoot

[11] Patent Number: 5,078,258

[45] Date of Patent: Jan. 7, 1992

[54] ORIENTING MECHANISM FOR ORIENTING FRUIT, FOR EXAMPLE

[75] Inventor: Jelle van der Schoot, Aalten, Netherlands

[73] Assignee: Aweta B.V., Nootdorp, Netherlands

[21] Appl. No.: 621,885

[22] Filed: Dec. 4, 1990

[30] Foreign Application Priority Data

Dec. 7, 1989 [NL] Netherlands ............ 8903017

[51] Int. Cl.⁵ ............................................. B65G 47/24
[52] U.S. Cl. .................... 198/384; 198/394; 198/395; 209/581; 209/701
[58] Field of Search ............ 198/384, 394, 395; 99/550; 209/538, 540, 545, 701, 580, 581

[56] References Cited

U.S. PATENT DOCUMENTS

| | | | |
|---|---|---|---|
| 2,220,511 | 11/1940 | Carroll | 198/384 |
| 2,254,594 | 9/1941 | Carroll | 99/550 X |
| 2,540,020 | 1/1951 | Waters | 198/384 |
| 2,909,270 | 10/1959 | Hait | 198/384 |
| 2,935,175 | 5/1960 | Wurgaft | 198/384 |
| 3,085,672 | 4/1963 | Wurgaft | 198/384 X |
| 3,163,282 | 12/1964 | Shropshire et al. | 198/384 |
| 3,272,311 | 9/1966 | Blakewell et al. | 198/384 |
| 3,602,281 | 8/1971 | Anderson et al. | 198/384 X |
| 3,605,984 | 9/1971 | Erekson et al. | 198/384 |
| 3,913,028 | 11/1975 | Hait | 99/550 |
| 4,169,528 | 10/1979 | Amstad | 198/394 X |
| 4,726,898 | 2/1988 | Mills | 209/581 X |
| 4,940,536 | 7/1990 | Cowlin et al. | 198/384 X |
| 4,954,044 | 9/1990 | Chizaki | 198/394 X |
| 4,981,205 | 1/1991 | Cowlin | 198/384 X |

FOREIGN PATENT DOCUMENTS 0056790 7/1982 European Pat. Off. .
0332477 9/1982 European Pat. Off. .

Primary Examiner—D. Glenn Dayoan
Attorney, Agent, or Firm—Griffin Branigan & Butler

[57] ABSTRACT

This invention relates to an orienting apparatus for orienting round or approximately round articles, for instance fruit, comprising two parallel rollers extending obliquely upwardly and rotating in the same direction, and a chain with conveying elements, arranged above the rollers and extending obliquely upwardly, each conveying element having a holder formed with an annular cup in which a ball is mounted. The ball is freely rotatably mounted on a horizontal bearing pin in the holder so that a quick orientation of the articles can be accomplished.

8 Claims, 2 Drawing Sheets

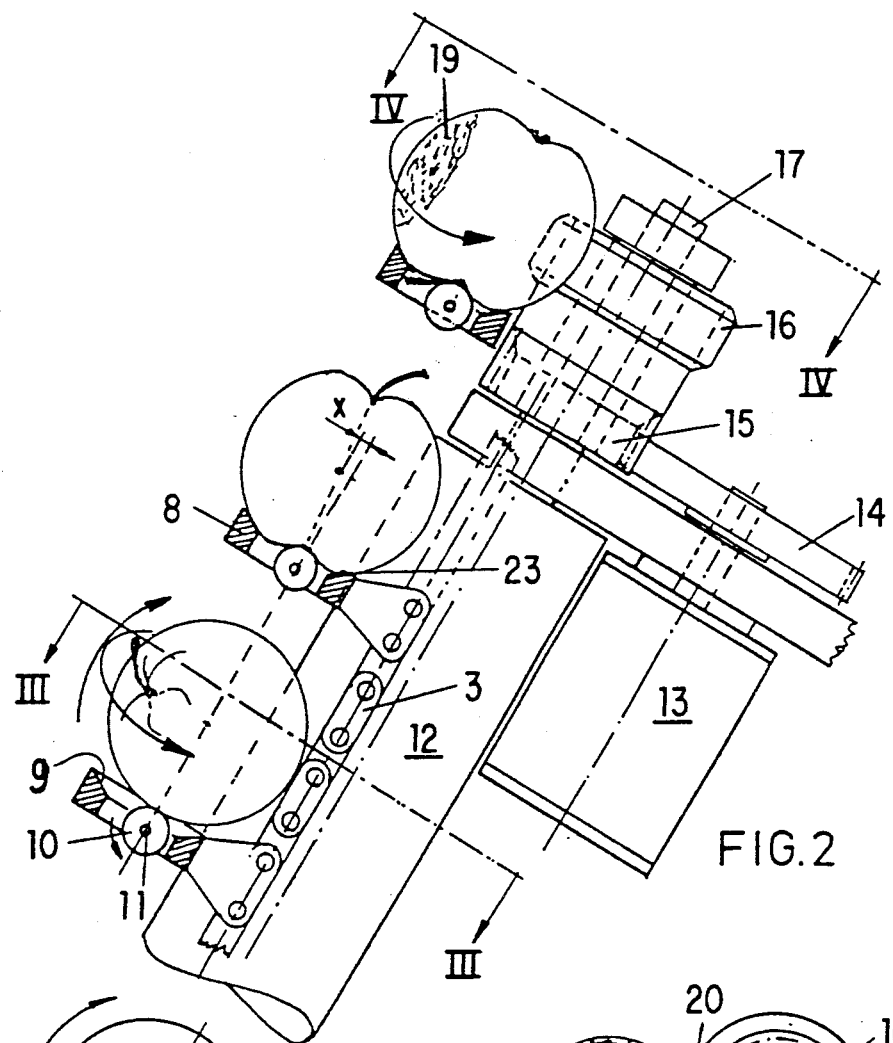
FIG.2
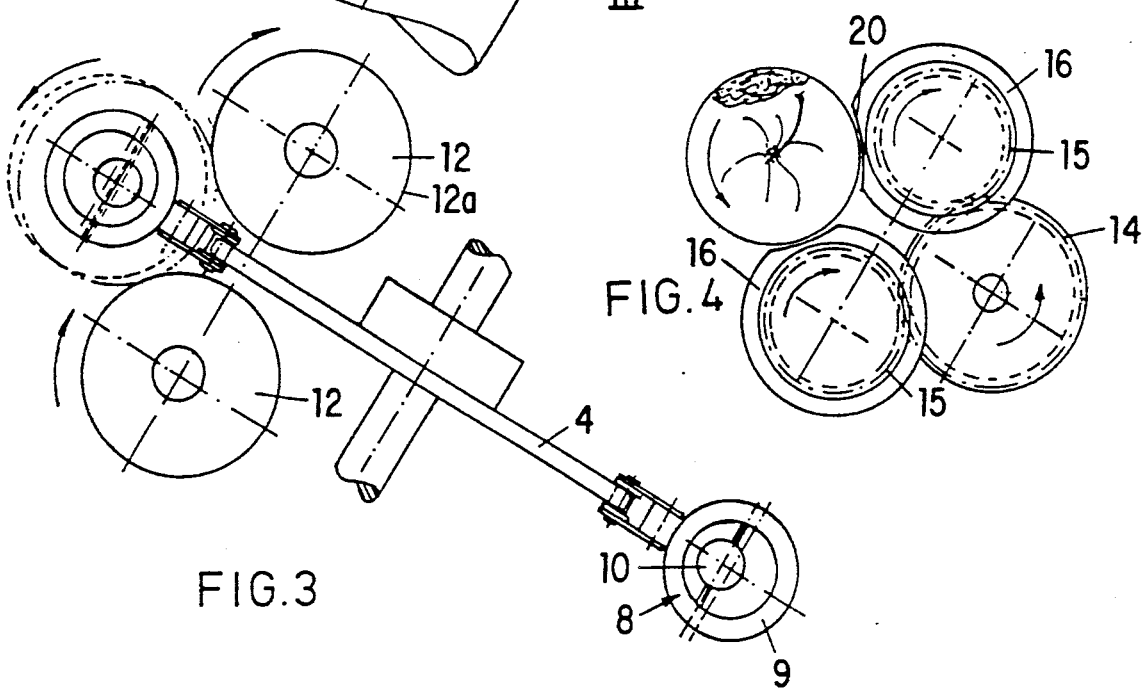
FIG.3
FIG.4

ORIENTING MECHANISM FOR ORIENTING FRUIT, FOR EXAMPLE

This invention relates to an orienting mechanism for orienting round or approximately round articles, such as fruit, comprising two parallel rollers extending obliquely upwardly and rotating in the same direction, and a chain with conveying elements, arranged above the rollers and extending obliquely upwardly.

BACKGROUND OF THE INVENTION

In such an apparatus as known from European patent application 0.332.477, the conveying elements mounted on the chain each consist of a pin mounted on the chain and driven for rotation, the top end of said pin being provided with a spherical member. Thus, the possibility is created that the products rotating about one axis under the influence of the rotating rollers can also be moved about an axis perpendicular thereto, in such a way that the fruit is oriented, i.e. at a certain moment the fruit has one of its hollows in alignment with its core coming into contact with the spherical member.

Not only is this apparatus relatively complicated, but also, after the desired orientation described above has been achieved, the product may easily become disoriented, because the product remains in contact with the rollers and the driven spherical member.

It is an object of this invention to overcome the drawbacks mentioned.

SUMMARY OF THE INVENTION

To that effect, the orienting mechanism is characterized in that each conveying element consists of a holder formed with an annular cup in which a ball is mounted. Thus, the article to be oriented, after being oriented, will settle over the ball and onto the holder with, for example, the indented core end of an apple over the ball so that the apple will be carried along exclusively by the holder and will not contact the rollers.

Thus, it is not only accomplished that the oriented products remain in their position, but also a considerably simpler apparatus is obtained.

A further improvement is obtained when the ball is rotatably mounted on a horizontal bearing pin. Thus, it is ensured that the article is oriented as quickly as possible and in the proper way.

The invention is further characterized by the means for discontinuing the contact between the fruit and the rotating rollers after orientation. These means concern a proper arrangement or distancing of the ball relatively to the rollers so as to move the settled article away from the rollers.

A further means comprises the eccentric arrangement of the ball in the annular cup, but the discontinuation of contact of the fruit with the rollers contemplated may also be accomplished by a construction with the roller side of the cup being raised relatively to the remaining portion of the cup.

In further elaboration of the invention, when a bloom orientation is contemplated after orientation of the centerline of the article, e.g. the core of an apple, the upwardly extending chain with holders can be stopped temporarily, whereafter, by means of a separate servo drive and at least one friction wheel, the fruit is rotated about its centerline before a color camera until the proper position is achieved.

Each friction wheel may be provided with a hollow, so that when the fruit is being brought or has been brought into the proper position before the color camera, no collision with other fruit can occur.

Owing to the fact that the present apparatus does not require the use of driven spherical members, e.g. a driven ball, a considerably simpler apparatus is obtained. Also, when the oriented article settles over the ball, and thus clears the rollers and is supported only by the cups, disorientation of the article is impossible.

For the sake of completeness, reference is made to European patent application 0.056.790, which discloses a similar apparatus as is described in European patent application 0.332.477 referred to above, with the understanding that in the apparatus the products to be oriented move downwards along the rollers under the influence of their weight, as contrasted with said European application and the present application.

BRIEF DESCRIPTION OF THE DRAWINGS

One embodiment of the orienting apparatus will now be further explained and illustrated with reference to the accompanying drawings, in which:

FIG. 2 is an enlarged detail of the apparatus of FIG. 1;

FIG. 3 is a sectional view taken on the line III—III of FIG. 2; and

FIG. 4 is a view taken on the line IV—IV of FIG. 2.

DESCRIPTION OF PREFERRED EMBODIMENTS

Figure 1:
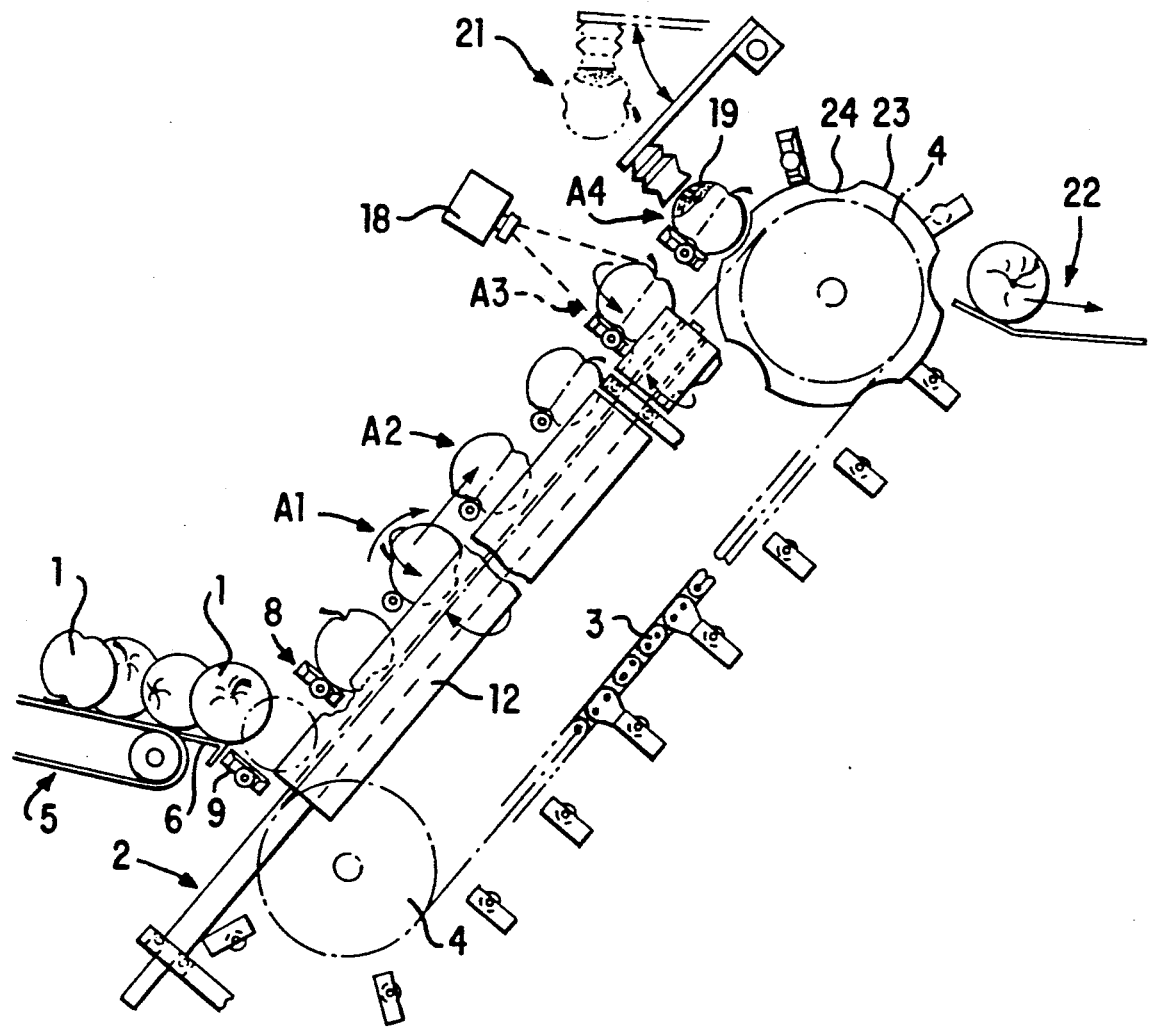
FIG. 1 is a schematic side view of an orienting apparatus according to the invention.

Referring to the drawings, an orienting apparatus for orienting round or virtually round products such as apples 1 comprises a frame 2, shown only in part. Arranged in frame 2 is a chain conveyor 3 trained over chain wheels 4.

Fruits to be oriented—apples 1, in this case—are supplied via a conveyor 5 and via an intermediate plate 6 successively to a holder 8 of the chain conveyor.

As appears more particularly from FIG. 2, each holder consists of an annular cup 9 (also see FIG. 3) with a spherical element 10 provided therein (see FIGS. 2 and 3). The element 10 is rotatably mounted on a pin 11 whose centerline extends in a plane parallel to the plane of transport of the articles. Arranged at the chain conveyor are rotatable rollers 12 (see also FIG. 3) extending obliquely upwardly. The rollers 12 are rotated in the same direction, i.e. co-rotating, via means that are not shown and may have friction means 12a for friction relative to the article.

The position of the apple after being deposited from the conveyor 5 onto a holder 8 is designated A1. In this position, the apple will be rotated in two mutually perpendicular directions due to its being in contact with the rotating rollers 12 and the spherical element 10.

As soon as the apple has reached the position designated A2, the apple will roll back slightly (away from rollers 12) over the eccentric element 10 (FIG. 2) so that the centerline of the apple is displaced from rollers 12 by a distance x, i.e. the apple will come clear of the rollers 12, i.e. out of contact therewith, since in this position gravity holds the apple in the holder so that the apple is away from rollers 12 and the apple will not be rotated anymore, i.e. will remain in the position it has reached by then.

In this position, the oriented apple along with its holder reaches the position designated A3, where the chain conveyor is stationary for a short interval. At that time, a servo motor 13 is operated which rotates friction rollers 16 via gear wheels 14 and 15, which friction rollers 16 are mounted for free rotation on the projecting portion of roller shafts 17.

Then, by means of a color camera 18 shown in FIG. 1, the highest intensity of the bloom of the color 19 on the apple, e.g. a more reddish area, is determined, whereafter the servo motor stops automatically so as to cease rotation of the apple. The whole mechanism can be constructed in such a way that each time a maximum bloom color intensity is determined—based on the bloom's fading as the more reddish area is rotated away from the camera—the color camera causes the servo motor to make a slight reverse rotation, so that the portion of greatest color intensity is precisely in the facing position of the camera.

To avoid any disturbance of the position of the apple upon its entering the position designated A3, the friction rollers 16 may be provided with a hollow 20.

Just beyond the color camera, the apples can be taken off by a take-off mechanism 21 at position 4A (see FIG. 1), for instance, a vacuum-operating suction pad system, and in that position be supplied to a packaging mechanism (not shown).

Whenever, by whatever cause, any apples that were supplied have not been oriented, they can be conveyed further to a removal station 22, e.g. a simultaneously rotating disc 23 with pockets 24 providing support in the bends.

It will be clear that a great number of modifications are conceivable without departure from the invention.

I claim:

1. In an orienting apparatus for orienting round or approximately round articles, wherein two obliquely upwardly oriented, parallel, co-rotatable rollers have associated therewith a chain conveyor with article-conveying elements thereon, which elements are positioned between and above said rollers for successively contacting and conveying successive articles upwardly along and parallel with said rollers while rotating the articles so as to orient the articles with respect to the rollers during travel along said rollers, the improvement comprising:

article-conveying elements disposed on said chain and each element having a cup-shaped article holder with a rotatable ball mounted in the holder wherein the ball is freely rotatable along an axis transverse the axis of the rollers, so that the articles are freely rotatable in two perpendicular directions during travel upwardly along said rollers.

2. An apparatus according to claim 1, wherein the ball is rotatably mounted on a horizontal bearing pin in the holder.

3. An apparatus according to claim 1, wherein the two rollers are provided with friction means disposed such as to contact the surface of the article.

4. An apparatus according to claim 1, wherein means are provided for discontinuing contact between the articles and the rotating rollers after orientation of the articles.

5. An apparatus according to claim 4, wherein the discontinuation of the contact between the articles and the rollers is accomplished by an eccentric positioning of the ball in the holder.

6. An apparatus according to claim 4, wherein the discontinuation of the contact between the article and the rollers is further accomplished by the holder having a raised portion on a roller side of the holder relatively to other sides of the holder.

7. An apparatus according to claim 1 or claim 2 or claim 3 or claim 4 or claim 5 or claim 6, wherein the article is a fruit and a color bloom orientation of the fruit is accomplished after orienting the fruit, wherein the chain is stopped for a predetermined time and means are provided for fruit rotation about a core centerline thereof before a color camera, said means being a separate servo drive and at least one friction wheel, and wherein said rotation being discontinued after the maximum color intensity has been determined by said color camera.

8. An apparatus according to claim 7, wherein each friction wheel is provided with a hollowed outer portion.

* * * * *